UNITED STATES PATENT OFFICE.

WILLIAM A. WALLER AND JAMES P. HITCH, OF BLANDINSVILLE, ILLINOIS.

COMPOSITION FOR SLATING SURFACES OF BLACKBOARDS.

SPECIFICATION forming part of Letters Patent No. 239,409, dated March 29, 1881.

Application filed June 1, 1880. (No specimens.)

*To all whom it may concern:*

Be it known that we, WILLIAM A. WALLER and JAMES P. HITCH, both of Blandinsville, in the county of McDonough and State of Illinois, have invented certain new and useful Improvements in Composition for Slating Surfaces of Blackboards; and we do hereby declare that the following is a full, clear, and exact description of the invention, which will enable others skilled in the art to which it appertains to make and use the same.

Our invention has for its object to provide an improved composition for slating the surface of blackboards and other similar articles, which will effectually resist the action of water and acids used for cleaning off chalk-marks, and which will receive the mark of chalk as readily as the best quality of slate; and the composition consists of the ingredients mixed in the proportions and applied to the surface of the article to be coated, all as will be hereinafter more fully described.

In preparing our composition, we take one pound of lamp-black, of good quality, and one pound of gum-arabic, or other suitable cohesive gum, and mix them together, with sufficient soft water, to about the consistency of mucilage, to which we then add eight pounds of Spanish white and sixteen pounds of plaster-of-paris, and again mix the entire mass thoroughly and rapidly, until it assumes the thickness of ordinary plasterer's white-coating, when it is ready for use. The composition, thus prepared is applied, to the surface to be coated by means of a trowel and rollers, so as to insure of a straight and even surface, which cannot be attained by the use of liquid enamel applied with a brush. This composition, thus prepared and applied, presents, when dry, a hard enameled surface, resembling slate in appearance, and which will not crack or peel off by continued use, and capable of receiving the mark of chalk as readily as the best quality of slate, the chalk-marks being easily removed by a damp sponge or cloth, as in the usual manner.

The advantages of our composition will be readily apparent without a more minute description, inasmuch as it can be readily applied in any thickness desired, and presents a smoother surface than can be attained by the use of other artificial slating, which has to be applied with a brush.

We are aware that certain proportions of lamp-black, gum-arabic, and plaster-of-paris have heretofore been combined with other ingredients to form a composition for slating blackboards, and we do not therefore desire to be understood as claiming these ingredients separately; but

Having thus described our invention, what we claim as new and useful is—

The hereinbefore-described composition for slating blackboards and other surfaces, consisting of lamp-black, gum-arabic, Spanish white, and plaster-of-paris, mixed with water, in the proportions substantially as and for the purpose specified.

In testimony that we claim the foregoing as our own we affix our signatures in presence of two witnesses.

WILLIAM A. WALLER.
JAMES P. HITCH.

Witnesses:
T. B. HUSTON,
WM. P. WELCH.